US011935331B2

(12) United States Patent
Ghalyan

(10) Patent No.: US 11,935,331 B2
(45) Date of Patent: Mar. 19, 2024

(54) METHODS AND SYSTEMS FOR REAL-TIME ELECTRONIC VERIFICATION OF CONTENT WITH VARYING FEATURES IN DATA-SPARSE COMPUTER ENVIRONMENTS

(71) Applicant: THE BANK OF NEW YORK MELLON, New York, NY (US)

(72) Inventor: Ibrahim Ghalyan, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 418 days.

(21) Appl. No.: 17/192,369

(22) Filed: Mar. 4, 2021

(65) Prior Publication Data
US 2022/0284213 A1    Sep. 8, 2022

(51) Int. Cl.
*G06V 40/30* (2022.01)
*G06F 18/21* (2023.01)
(Continued)

(52) U.S. Cl.
CPC ............ *G06V 40/33* (2022.01); *G06F 18/214* (2023.01); *G06F 18/2163* (2023.01); *G06F 18/22* (2023.01); *G06F 18/23213* (2023.01); *G06F 18/24* (2023.01); *G06N 20/00* (2019.01); *G06V 10/40* (2022.01); *G06V 10/44* (2022.01);
(Continued)

(58) Field of Classification Search
CPC ........ G06V 40/33; G06V 10/40; G06V 10/44; G06V 10/74; G06V 10/762; G06V 10/764; G06V 10/774; G06V 10/82; G06V 10/84; G06V 30/1423; G06F 18/214; G06F 18/2163; G06F 18/22; G06F 18/23213; G06F 18/24; G06N 20/00; G06N 3/084; G06N 7/01
See application file for complete search history.

(56) References Cited

U.S. PATENT DOCUMENTS 6,094,506 A * 7/2000 Hullender ............... G06F 18/21
382/192
6,366,699 B1 * 4/2002 Kuwano ............... H04N 21/426
382/199
(Continued)

OTHER PUBLICATIONS

International Search Report and Written Opinion of the International Searching Authority dated May 2, 2023, issued in corresponding International Application No. PCT/US2022/041637 (10 pgs.).
(Continued)

*Primary Examiner* — Aaron W Carter
(74) *Attorney, Agent, or Firm* — Pillsbury Winthrop Shaw Pittman, LLP

(57) ABSTRACT

The systems and methods provide a machine learning model that can exploit long time dependency for time-series sequences, perform end-to-end learning of dimension reduction and clustering, or train on long time-series sequences with low computation complexity. For example, the methods
(Continued)

and systems use a novel, unsupervised temporal representation learning model. The model may generate cluster-specific temporal representations for long-history time series sequences and may integrate temporal reconstruction and a clustering objective into a joint end-to-end model.

18 Claims, 10 Drawing Sheets

(51) Int. Cl.

| | | |
|---|---|---|
| G06F 18/214 | (2023.01) | |
| G06F 18/22 | (2023.01) | |
| G06F 18/23213 | (2023.01) | |
| G06F 18/24 | (2023.01) | |
| G06N 20/00 | (2019.01) | |
| G06V 10/40 | (2022.01) | |
| G06V 10/44 | (2022.01) | |
| G06V 10/74 | (2022.01) | |
| G06V 10/762 | (2022.01) | |
| G06V 10/764 | (2022.01) | |
| G06V 10/774 | (2022.01) | |
| G06V 10/82 | (2022.01) | |

(52) U.S. Cl.
CPC ............ *G06V 10/74* (2022.01); *G06V 10/762* (2022.01); *G06V 10/764* (2022.01); *G06V 10/774* (2022.01); *G06V 10/82* (2022.01)

(56) References Cited

U.S. PATENT DOCUMENTS

| | | | | |
|---|---|---|---|---|
| 8,577,091 | B2* | 11/2013 | Ivanov | G06V 20/80 382/115 |
| 8,953,848 | B2* | 2/2015 | Ivanov | G06V 40/13 382/209 |
| 2008/0226175 | A1* | 9/2008 | Suzuki | G06V 40/168 382/190 |
| 2009/0037463 | A1* | 2/2009 | Terao | G06F 16/93 |
| 2010/0241859 | A1* | 9/2010 | Osmolovsky | H04L 1/0009 713/170 |
| 2011/0249889 | A1* | 10/2011 | Kothandaraman | G06T 7/32 382/154 |
| 2011/0249891 | A1* | 10/2011 | Li | G06F 18/254 382/165 |
| 2015/0310798 | A1* | 10/2015 | Heide | G09G 3/007 345/55 |
| 2020/0302173 | A1* | 9/2020 | Deng | G06F 18/40 |
| 2022/0284213 | A1* | 9/2022 | Ghalyan | G06F 18/214 |

OTHER PUBLICATIONS

H.S. Yoon et al., "An On-line Signature Verification System Using Hidden Markov Model in Polar Space", Frontiers in Handwriting Recognition, 2002. Proceedings Eighth International Workshop on Aug. 6-8, 2002, Piscataway, NJ, pp. 329-333.

* cited by examiner

400

Sequence of the signature

Sequence of states $$S = [x_3, x_3, x_3, x_3, x_2, \ldots, x_2, x_3, x_1, x_1, x_3]$$

700

| Technique | Error Rate [%] |
|---|---|
| Graph Matching | 7.9 |
| Morphology + SVM | 11.23 |
| Surroundness+NN | 8.33 |
| Chain Code+SVM | 7.84 |
| Curvelet Transform+SVM | 5.6 |
| Feature Learning + SVM | 4.63 |
| OSTM-SV | 2.87 |

FIG. 7

METHODS AND SYSTEMS FOR REAL-TIME ELECTRONIC VERIFICATION OF CONTENT WITH VARYING FEATURES IN DATA-SPARSE COMPUTER ENVIRONMENTS

BACKGROUND

In conventional computer systems, communications are often transmitted in systems across multiple assets, applications, domains, and/or networks. In many cases, these communications may include the verification content in one or more images. However, despite the tangible progress in artificial intelligence ("AI") and its application to content verification, in many disciplines, verification still requires manual review. This is particularly true when the content is a user's signature, or other content that may exist in a data-sparse computer environment.

For example, the use of AI for image recognition and content identification has been pursued using deep learning techniques. However, deep learning requires that there is a robust amount of data available to train a deep learning model. A data-sparse computer environment, like that of real-time electronic signature verification, lack this robust amount of data. In fact, in many instances, a verification system may only have a single image (e.g., a single example of a signature) to train upon.

In such environments, conventional systems may abandon any AI-based approaches to verifying content, and instead rely on detecting exact matches. However, this approach is not practical when dealing with content (e.g., a user's signature) that may have varying features.

SUMMARY

Accordingly, methods and systems are described herein for real-time electronic verification of content with varying features in data-sparse computer environments. These methods and systems provide numerous technical benefits, including enhanced accuracy of the content (e.g., signature) verification process, applicability in data-sparse computer environments (e.g., situations where only one authenticated signature from a signee is available), robustness against poorly scanned/imaged content (e.g., a poorly scanned, or poor quality, image of a signatures), relaxation of the input requirements of generated content (e.g., requirements to capture tilt and velocity of pens during a signature), and a tangible reduction in complexity of hardware requirements (e.g., the use of redundant systems to maintain accuracies and/or the need to provide hardware to allow for manual review).

To obtain these benefits, the methods and systems extract specific features (e.g., a dynamic behavior of a sequence comprising a sequence of intensity of pixels composing the image) of content in an image. For example, the system determines an optimal stochastic transition matrix ("OSTM") and uses the OSTM to make decisions (e.g., verification decisions). The OSTM-based verification is efficient in data-sparse environments (e.g., for any given number of signatures per signee) and provides robustness against noise in images (e.g., in poorly scanned/imaged images). For example, with respect to a signature verification decision, the system converts the signature into a sequence. The pixels that represent the signature are analyzed as a sequence of data (e.g., each pixel in the signature corresponds to a different value in the sequence of data). The system compares the relationship between the values of the data sequence. By using the relationships between pixels (e.g., the vertical and/or horizontal concatenations of pixels composing an image) in the sequence, as opposed to an absolute matching of two images, the system identifies forgeries of the signature even in the presence of varying features and/or without examples of forgeries. Furthermore, while a user may modify the size, writing utensils/input device, and/or other characteristics of a signature (resulting in signatures that are not exact), the route taken by a user when creating the signature is constant (in a dynamic sense). By making decisions based on the route, the system achieves the aforementioned benefits which are not possible with conventional systems.

In some aspects, the systems and methods are suitable for real-time electronic signature verification in data-sparse computer environment. For example, the system may receive a first image, wherein the first image comprises a first signature. The system may determine a first sequence, wherein the first sequence comprises a sequence of intensity of pixels composing the first image. The system may extract a first dynamic behavior of the first sequence. The system may receive a second image, wherein the second image comprises a second signature. The system may determine a second sequence, wherein the second sequence comprises a sequence of intensity of pixels composing the second image. The system may extract a second dynamic behavior of the second sequence. The system may generate for display, on a user interface, a recommendation based on comparing the first dynamic behavior to the second dynamic behavior.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 7 depicts an illustrative diagram of error rates for a plurality of verification techniques, in accordance with an embodiment.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

Figure 1:
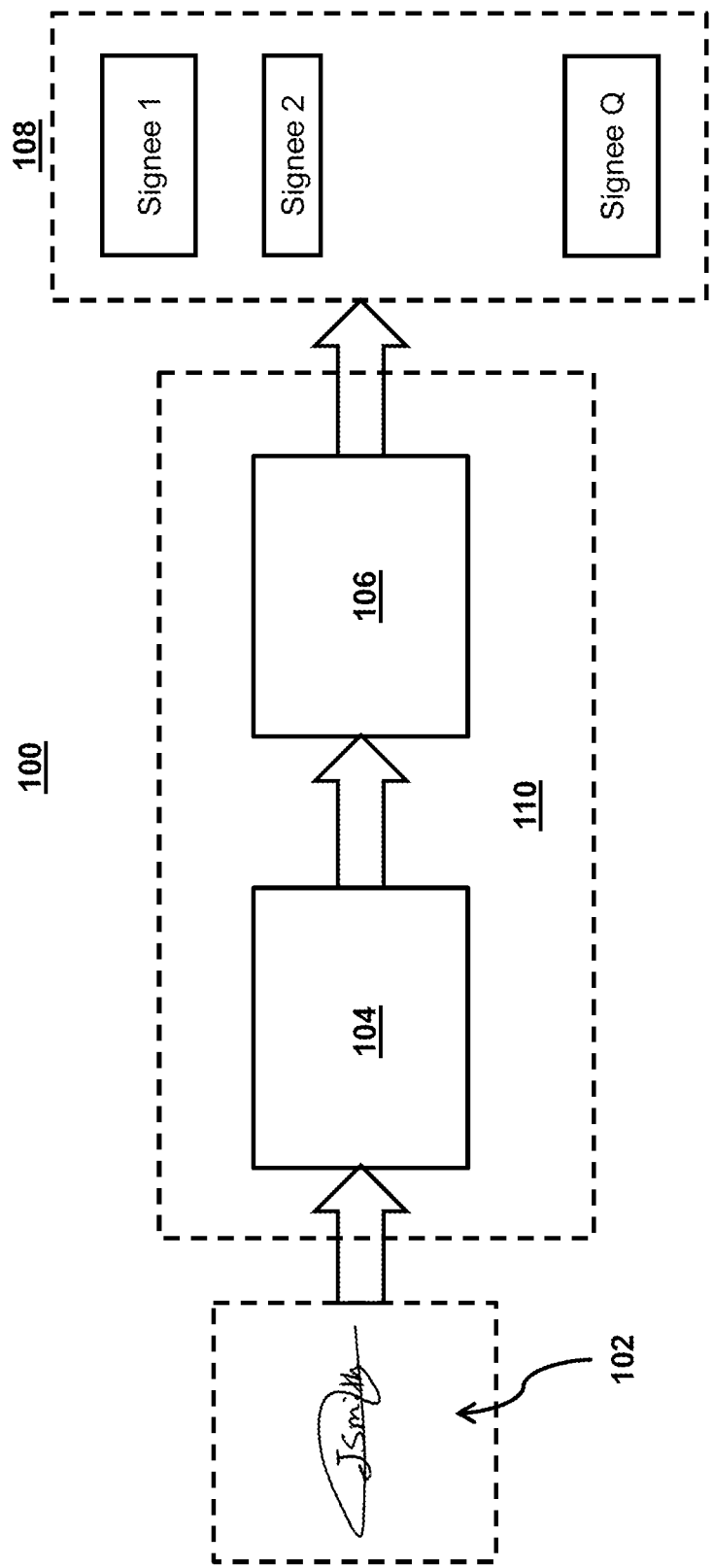
FIG. 1 depicts an illustrative diagram of a system for real-time electronic signature verification in a data-sparse computer environment, in accordance with an embodiment.

FIG. 1 depicts an illustrative diagram of a system for real-time electronic signature verification in a data-sparse computer environment, in accordance with an embodiment. For example, system 100 includes input 102, model 110, and output 108. For example, input 102 may comprises a signature, and output 108 may comprise an identification of a user corresponding to the signature. For example, model 110 may determine whether or not the signature corresponds to a known user in order to determine who provided the signature. In another example, input 102 may comprises a signature that requires electronic verification, and output 108 may comprise a determination of whether or not the signature matches an authenticated signature. For example, model 110 may determine whether or not the signature that requires electronic verification matches the authenticated signature in order to detect a forgery. Model 110 may include a feature extraction component (e.g., component 104) and a decision-making component (e.g., component 106).

For example, as one practical application, a wire instruction (WI) may be received requesting to perform a transaction. The WI may be a signed document, and transmitted as a part of a procedure to release a payment indicated by the WI. A first step in this process is to verify that a signee is authorized to perform the release of the payment. Such verification is performed by having a list of authorized signees, called the incumbency certificate (IC), who have the authority to release a certain amount in a transaction. The list of authorized individuals for each transaction and/or document in a transaction may differ. The system may have instructions stating who is authorized to release an allowable amount of payment with the signature of each authorized signee. Each time the system receives a wire instruction from a client, the signature on the wire instruction is verified against the pre-defined list of authorized signees. If signatures on the considered wire instruction match corresponding authorized signatures, then the system releases the indicated payment.

Currently, manual signature verification is required for such tasks. To realize the automation of such signature authentication process, an efficient signature verification system is needed, where the input to the system is an image of a signature, and the output is a decision determining if the given signature belongs to a signee or not. System 100 may realize this result in the framework of computer vision by performing two main stages: feature extraction and decision-making based on extracted features. In the feature extraction stage (e.g., occurring at component 104), pixels of an image of a signature are converted into a set of numeric values called features of the given image. Features of a given image of a signature are used as inputs to the second stage (e.g., occurring at component 106), the decision-making process, which generates a decision and gives the signee who has most likely signed the given signature.

Conventional systems have multiple issues and technical limitations in real-time and/or data-sparse environments, as there are only a limited number of signature samples available. This data sparsity prevents application of techniques such as deep learning that require many signatures per signee. Additionally, conventional techniques cannot handle the realities of these practical applications, including poor scanning of images that results in tangibly degraded quality of images of signatures, and/or reduces the efficiency of the overall signature authentication process.

For example, while deep learning-based models result in enhanced verification performance, they require relatively many images of signatures for each subject, which might not be a well-received requirement from the client side, leading to a potential clients' aversion. Other techniques, such as support vector machines, neural networks, and others that rely on image recognition in conducting the signature verification process are susceptible to noise in images caused by improper scanning of a signature, which degrades its performance, necessitating further pre-processing, like filtering, in order to meet a certain verification performance. Techniques like histogram of oriented gradients, and local binary patterns based signature verification processes ignore the spatial behavior of pixels in scanned images of signatures, which degrades the performance of the verification task. Finally, even though techniques like the hidden Markov model might capture sequential behavior of pixels of a signature image, they rely on optimizing the likelihood of functions that might lead to local optima during the learning process, or even in singularity situations, where the solution is not obtained for a certain initialization of a parameters set in the modelling process, leading to inaccuracies.

The issues above rendered the automation process of the signature verification a challenging task. To address such issues and enable successful signature verification, system 100 may use a signature verification mechanism, where an OSTM is used in the feature extraction stage. The OSTM will be shown to be efficient for any given number of signatures per signee, provide robustness against noise in images, and open the door towards employment of already verified signatures of WI, along with IC signatures to overcome issues of readability of signatures.

For example, to overcome the above limitations, OSTM based signature verification is performed by system 100. In OSTM signature verification, pixels of a signature image are converted into a sequence of intensity by vertical and horizontal concatenations. The OSTM of the resulted sequence is computed with an optimal number of partitions (e.g., a number selected such that the entropy is maximized). The OSTM represents the optimal dynamics of the sequence of pixels and a forging—or tangible variation—in the signature which has a direct impact to the OSTM, allowing addressing forgery detection in the context of anomaly detection in the sequence of pixels using deviations in OSTM. Furthermore for situations of signature classification, the OSTM is used as input to the classification stage. Hence with signatures labeled, available classification techniques can be used to classify given signatures, rendering the OSTM signature verification applicable to both situations of forgery detection and classification of signatures. Furthermore, the OSTM signature verification performed by system 100 does not require a large number of samples. Indeed it can be applied to situations even if only one signature per signee is given. Moreover, the use of the notion of symbolic dynamic by system 100 adds a filtering feature for possible noise in signature images, adding robustness against noise in scanned images.

Additionally, the use of OSTM signature verification performed by system 100 is based on the extraction of optimal dynamic representation of the sequence of pixels from scanned signatures. Hence any forging process applied to the signature—or tangible variation—will have a significant impact on the extracted dynamics, allowing efficient and sensitive signature verification. The computation of the OSTM is performed without the need for solving non-convex optimization tasks, which eliminates potential trapping into local optima or performance degradation. Accordingly system 100 is applicable to both forgery detection and signature classification, and those featuring both large and small datasets of signatures. System 100 is robust against noise in a signature image, has efficient capture of sequential behavior of pixels, and prevents a potential trap in local optima. As an additional benefit, the relaxation of this potential trap prevents the generation of false positives as a user squeezes a signature into a small space (e.g., in a document).

System 100 may be used for a plurality of applications. For example, system 100 may be used to make determinations based on any content. As referred to herein, "content" should be understood to mean an electronically consumable and/or scannable user asset, such as images, video clips, audio content, rotating images, documents, playlists, websites, articles, books, electronic books, blogs, advertisements, chat sessions, social media content, applications, games, and/or any other media or multimedia and/or combination of the same.

For example, input 102 may comprise a medical image, and output 108 may comprise an identification of a condition related to the medical image. For example, model 110 may determine whether or not the medical image (or indicia in the medical image) corresponds to indicia of a known ailment in order to determine whether or not a user corresponding to the medical image has the known ailment. In another example, input 102 may comprise a biometric identifier (e.g., a fingerprint, an iris scan, etc.) that requires electronic verification, and output 108 may comprise a determination of whether or not the biometric identifier matches an authenticated biometric identifier. For example, model 110 may determine whether or not the biometric identifier that requires electronic verification matches the authenticated biometric identifier in order to verify the identity of a user corresponding to the biometric identifier. In these cases, the extracted features from an input may be used as inputs at a decision-making stage in model 110, which may be a classification model that is trained to perform the mapping between the extracted features and a corresponding label (e.g., if an image corresponds to a positive or negative condition, identifier, etc.).

For example, the spread of the coronavirus, also called Covid-19, in many countries around the world resulted in a tangible increase in the number of cases, causing significant outages in numbers of staff at healthcare facilities and hospitals. Hence automation of covid-19 diagnosis supports workers by addressing outages in the number of healthcare workers, and assists in reducing potential risk of infection to medical staff. System 100 may be applied to the diagnosis of Covid-19 cases based on images captured by computerized tomography ("CT") scanners. Using the CT scan images, system 100 may precisely diagnose the status of patients and enable accurate detection of the infection of Covid-19. System 100 detects Covid-19 based on CT scan images by extracting the features of CT scan images. The extracted features are used as inputs in the decision-making stage of model 110, which is a classification model that is trained to perform the mapping between the extracted features and the corresponding label (e.g., if the CT scan image corresponds to positive or negative cases).

In another example, system 100 may assist in determination based on other content. For example, input 102 may comprises content requiring identification, and output 108 may comprise a label for known content. For example, model 110 may determine whether or not the content corresponds to a known image in order to identify the image. In another example, input 102 may comprises an image that requires electronic verification, and output 108 may comprise a determination of whether or not the image matches an authenticated image. For example, model 110 may determine whether or not a user is present at a location (e.g., based on a known image of a user matching an image of a user at a location).

For example, sorting documents according to their category is one of the tedious problems in many institutions, especially with the growing number of daily documents processed. Hence, the automation of the process of document sorting lead practitioners to develop a mechanism that can automatically categorize incoming documents. While natural language processing (NLP) plays a key role in the field of document classification based on the text of an incoming document, its applicability is tangibly limited for addressing pictorial elements, like logos, stamps, and signatures, and image-based documents with limited ability to extract its corresponding text. Therefore, system 100 may be readily applied to the classification of images in of documents. Thus, features of scanned images are extracted by system 100, as described herein. Then model 110 (a classifier and/or other decision-making model) is trained based on the extracted features, and given labels of each document, thereby realizing the process of document sorting in an elegant and efficient way.

Figure 2:
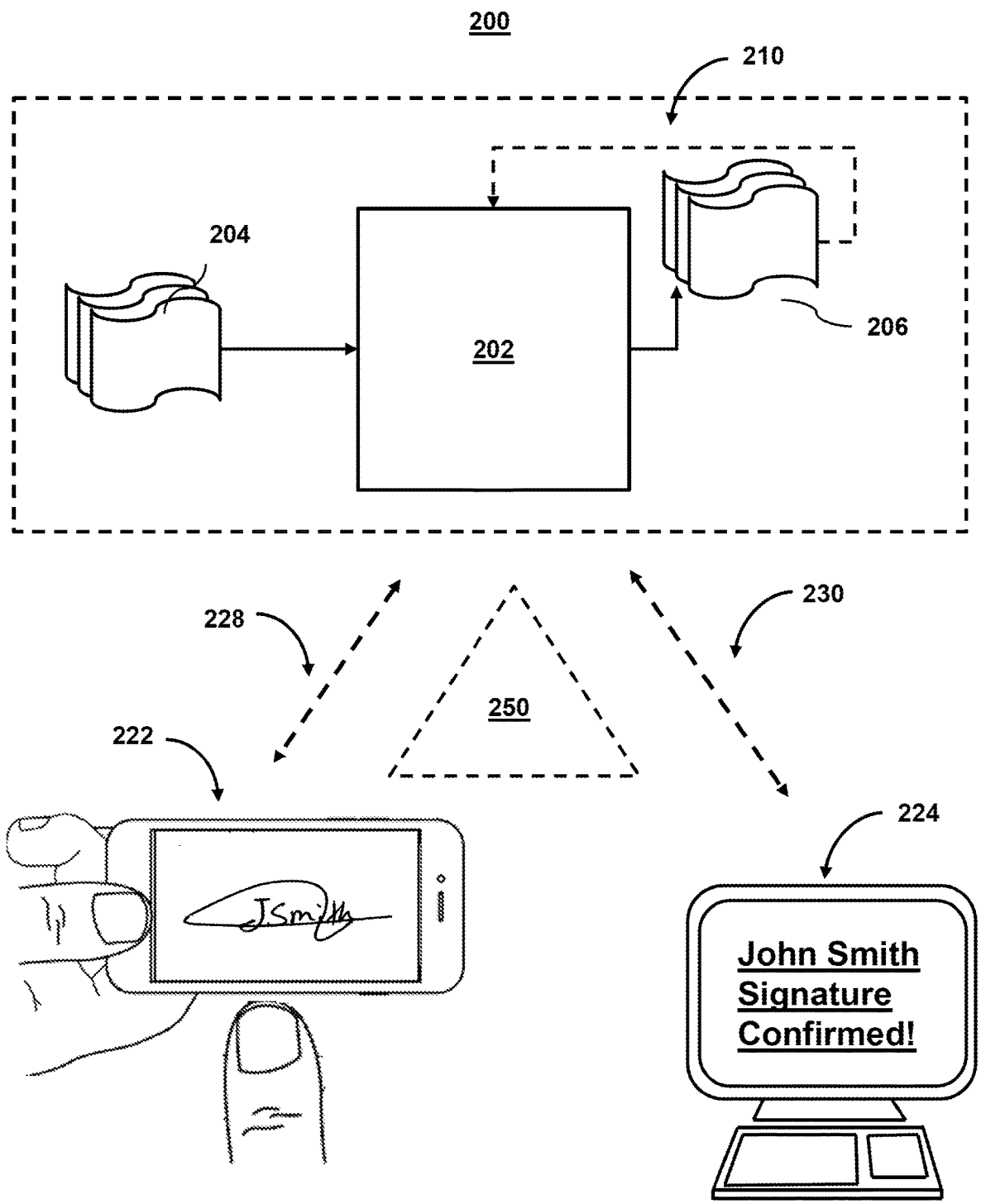
FIG. 2 depicts an illustrative system for real-time electronic signature verification in a data-sparse computer environment, in accordance with an embodiment.
Figure 4:
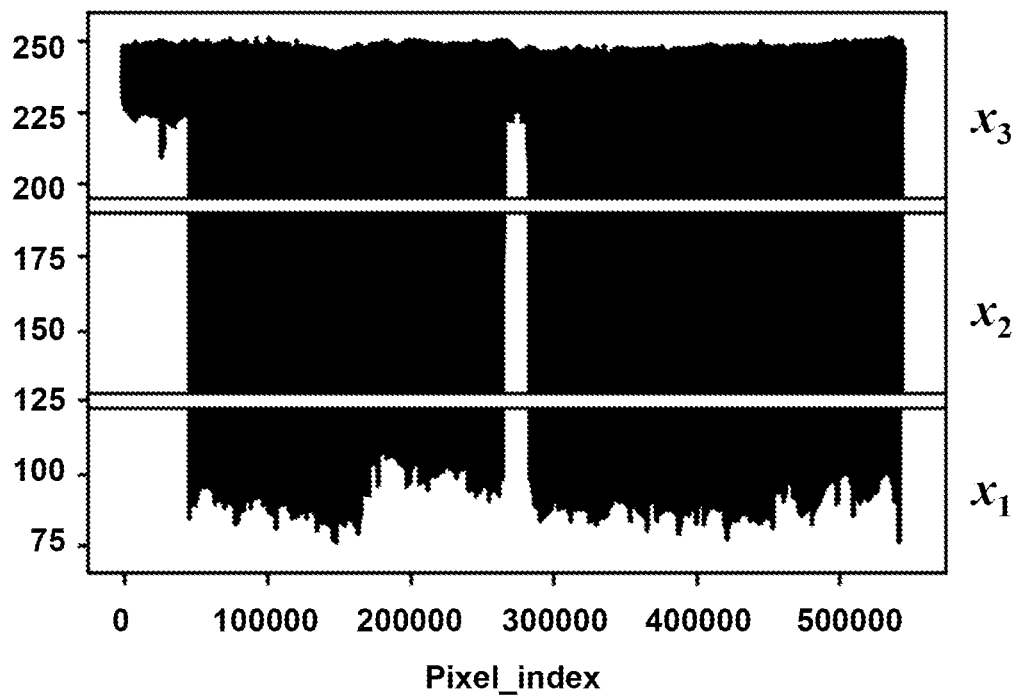
FIG. 4 depicts an illustrative diagram of mapping each sample of a sequence into its corresponding partition, in accordance with an embodiment.
Figure 4:
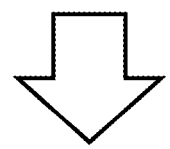

FIG. 2 depicts an illustrative system for real-time electronic signature verification in a data-sparse computer environment, in accordance with an embodiment. As shown in FIG. 4, system 200 may include mobile device 222 and user terminal 224. While shown as a smartphone and personal computer, respectively, in FIG. 2, it should be noted that mobile device 222 and user terminal 224 may be any computing device, including, but not limited to, a laptop computer, a tablet computer, a hand-held computer, other computer equipment (e.g., a server), including "smart," wireless, wearable, and/or mobile devices. FIG. 2 also includes cloud components 210. Cloud components 210 may alternatively be any computing device as described above and may include any type of mobile terminal, fixed terminal, or other device. For example, cloud components 210 may be implemented as a cloud computing system, and may feature one or more component devices. It should also be noted that system 200 is not limited to three devices. Users may, for instance, utilize one or more devices to interact with one another, one or more servers, or other components of system 200. It should be noted that, while one or more operations are described herein as being performed by particular components of system 200, those operations may, in some embodiments, be performed by other components of system 200. As an example, while one or more operations are described herein as being performed by components of mobile device 222, those operations may, in some embodiments, be performed by components of cloud components 210. In some embodiments, the various computers and systems described herein may include one or more computing devices that are programmed to perform the described functions. Additionally, or alternatively, multiple users may interact with system 200 and/or one or more components of system 200. For example, in one embodiment, a first user and a second user may interact with system 200 using two different components.

With respect to the components of mobile device 222, user terminal 224, and cloud components 210, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 2, both mobile device 222 and user terminal 224 include a display upon which to display data.

Additionally, as mobile device 222 and user terminal 224 are shown as touchscreen smartphones, these displays also act as user input interfaces. It should be noted that in some embodiments, the devices may have neither user input interfaces nor displays, and may instead receive and display content using another device (e.g., a dedicated display device, such as a computer screen and/or a dedicated input device such as a remote control, mouse, voice input, etc.). Additionally, the devices in system 200 may run an application (or another suitable program). The application may cause the processors and/or control circuitry to perform operations related to generating alternative content.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 2 also includes communication paths 228 and 230. Communication paths 228 and 230 may include the Internet, a mobile phone network, a mobile voice or data network (e.g., a 5G or LTE network), a cable network, a public switched telephone network, or other types of communications networks or combinations of communications networks. Communication paths 228 and 230 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 210 may be a database configured to store user data for a user. For example, the database may include user data that the system has collected about the user through prior interactions, both actively and passively. Alternatively, or additionally, the system may act as a clearing house for multiple sources of information about the user. This information may be compiled into a cross-platform profile. For example, one or more of cloud components 210 may include a microservice and/or components thereof. In some embodiments, the microservice may be a collection of applications that each contain information about a user, content, etc.

Cloud components 210 may include model 202, which may be a machine learning model. Model 202 may take inputs 204 and provide outputs 206. The inputs may include multiple datasets, such as a training dataset and a test dataset. Each of the plurality of datasets (e.g., inputs 204) may include data subsets related to user data, original content, and/or alternative content. In some embodiments, outputs 206 may be fed back to model 202 as inputs to train model 202. For example, the system may receive a first labeled feature input, wherein the first labeled feature input is labeled with known content (e.g., an authenticated signature). The system may then train the first machine learning model to classify the first labeled feature input into a class corresponding to the known content.

In another embodiment, model 202 may update its configurations (e.g., weights, biases, or other parameters) based on the assessment of its prediction (e.g., outputs 206) and reference feedback information (e.g., user indication of accuracy, reference labels, or other information). In another embodiment, where model 202 is a neural network, connection weights may be adjusted to reconcile differences between the neural network's predictions and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 202 may be trained to generate better predictions.

In some embodiments, model 202 may include an artificial neural network. In such embodiments, model 202 may include an input layer and one or more hidden layers. Each neural unit of model 202 may be connected with many other neural units of model 202. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 202 may be self-learning and trained, rather than explicitly programmed, and can perform significantly better in certain areas of problem solving, as compared to traditional computer programs. During training, an output layer of model 202 may correspond to a classification of model 202, and an input known to correspond to that classification may be input into an input layer of model 202 during training. During testing, an input without a known classification may be input into the input layer, and a determined classification may be output.

In some embodiments, model 202 may include multiple layers (e.g., where a signal path traverses from front layers to back layers). In some embodiments, back propagation techniques may be utilized by model 202, where forward stimulation is used to reset weights on the "front" neural units. In some embodiments, stimulation and inhibition for model 202 may be more free-flowing, with connections interacting in a more chaotic and complex fashion. During testing, an output layer of model 202 may indicate whether or not a given input corresponds to a classification of model 202 (e.g., an incident).

For example, in some embodiments, the system may train a machine learning model (e.g., an artificial neural network) to verify content (e.g., based on a similarity to known content). For example, the system may receive an image (e.g., comprising a signature). The system may then generate a feature input based on the known content (e.g., based on a OSTM of the known content).

The system may receive user data via a microservice and/or other means. For example, the microservice may comprise a collection of applications that each collect one or more of a plurality of variables. For example, the system may extract user data from an API layer operating on a user device, or at a service provider (e.g., via a cloud service accessed by a user). Additionally or alternatively, the system may receive user data files (e.g., as a download and/or streaming in real-time or near real-time).

System 200 also includes API layer 250. For example, through the use of an API layer, the system may more easily send and receive content that requires verification. For example, in some embodiments, the system may be implemented as one or more APIs and/or an API layer. In some embodiments, API layer 250 may be implemented on mobile device 222 or user terminal 224. Alternatively or additionally, API layer 250 may reside on one or more of cloud components 210. API layer 250 (which may be A REST or Web services API layer) may provide a decoupled interface to data and/or functionality of one or more applications. API layer 250 may provide a common, language-agnostic way of interacting with an application. Web services APIs offer a well-defined contract, called WSDL, that describes the services in terms of its operations, and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services as well as for exchanging information with partners in B2B transactions.

API layer 250 may use various architectural arrangements. For example, system 400 may be partially based on API layer 250, such that there is strong adoption of SOAP and RESTful Web-services, using resources like Service Repository and Developer Portal, but with low governance, standardization, and separation of concerns. Alternatively, system 200 may be fully based on API layer 250, such that separation of concerns between layers like API layer 250, services, and applications are in place.

In some embodiments, the system architecture may use a microservice approach. Such systems may use two types of layers: Front-End Layer and Back-End Layer, where microservices reside. In this kind of architecture, the role of the API layer 250 is to provide integration between Front-End and Back-End. In such cases, API layer 250 may use RESTful APIs (exposition to front-end or even communication between microservices). API layer 250 may use AMQP (e.g., Kafka, RabbitMQ, etc.). API layer 250 may use incipient usage of new communications protocols such as gRPC, Thrift, etc.

In some embodiments, the system architecture may use an open API approach. In such cases, API layer 250 may use commercial or open source API Platforms and their modules. API layer 250 may use developer portal. API layer 250 may use strong security constraints applying WAF and DDoS protection, and API layer 250 may use RESTful APIs as standard for external integration.

Figure 3:
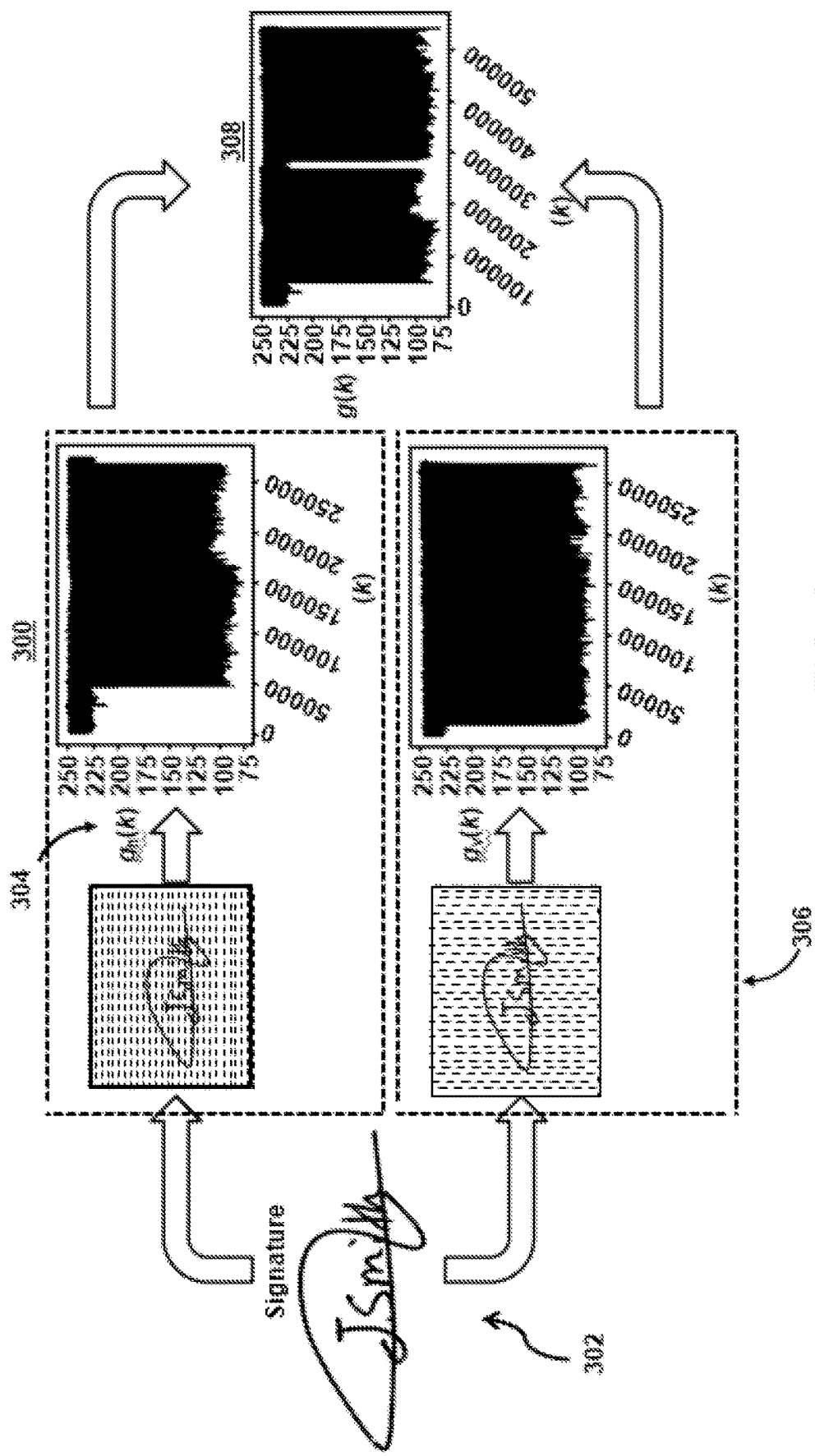
FIG. 3 depicts an illustrative diagram of a system for determining a sequence of intensity for both vertical and horizontal concatenations of pixels composing an image, in accordance with an embodiment.

FIG. 3 depicts an illustrative diagram of a system for determining a sequence of intensity for both vertical and horizontal concatenations of pixels composing an image, in accordance with an embodiment. For example, to increase accuracy, the system may, in some embodiments, capture spatial properties of an image (e.g., a signature). System 300 describes an embodiment where pixels are horizontally concatenated, row by row, to obtain a sequence of intensities of pixels (e.g., sequence 304) based on input 302. System 300 also describes an embodiment where a similar vertical concatenation, column by column, is also performed to obtain another sequence of intensities of pixels (e.g., sequence 306) based on input 302. Horizontal and vertical concatenations result in two distinct sequences (e.g., sequence 304 and sequence 306) that are cascaded to compose a sequence that represents the cumulative sequence of the signature image (e.g., output 308). For example, $g_h(k)$ and $g_v(k)$ may be the sequences resulting from horizontal and vertical concatenation processes, respectively. The final combination $g(k)$ of both horizontal and vertical sequences may correspond to:

$$g(k) = \begin{cases} g_h(k) & \text{for } 0 \le k \le N_h - 1, \\ g_v(k - N_h) & \text{for } N_h \le k \le 2N_h, \end{cases} \quad (1)$$

where k is the index of pixels, $N_h$ is the number of samples in $g_h(k)$, which is the same number of samples of $g_v(k)$.

The sequence g(k) captures both horizontal and vertical spatial sequences and sequential behavior of a given image of a signature. Hence, estimation of the dynamical behavior of the sequence g(k) represents extraction of features of the given image (e.g., input 302).

FIG. 4 depicts an illustrative diagram mapping each sample of a sequence into its corresponding partition, in accordance with an embodiment. For example, the system may extract a first dynamic behavior of the first sequence. In some embodiments, extracting the first dynamic behavior of the first sequence may comprise determining a first OSTM that represents the first dynamic behavior. For example, the system may extract a dynamic behavior of the sequence of intensities of pixels (e.g., of a signature image), by computing the OSTM. The system may compute the OSTM by dividing values of the obtained sequence (e.g., of a signature image). The dynamic sequence may comprise a series of partitions, in which each partition represents a symbol or a state of the given sequence.

For example, the system may partition the dynamic sequence using equidistance division on a scale of values, or using more sophisticated, optimal-partitioning, such as k-means clustering. Once the system has partitioned the dynamic sequence, the sequence of intensities is converted into a sequence of states, or symbols, by mapping each sample of the sequence into its corresponding partition, thereby obtaining a sequence of states instead of a sequence of crisp intensity values. For example, FIG. 4 shows a schematic diagram converting the given sequence of intensities into a sequence of states, using both equidistance partitioning and clustering for the case of three partitions.

The system may then determine a stochastic transition matrix by estimating the probability of transition from one state to another. The probability of transition from one state to another allows the system to identify the dynamic behavior in the image (e.g., a route taken by a pen in a signature). The probability of transition from one state to another may be found by:

$$\pi_{ij}(M) = \frac{N(x_j, x_i)}{N(x_i)} \quad (2)$$

where $N(x_j, x_i)$ is the number of transitions from partition $x_i$ to partition $x_j$, and $N(x_i)$ is the total number of occurrences of partition $x_i$, and $\pi_{ij}(M)$ is the computed probability of transition from partition $x_i$ to partition $x_j$ (i, j=1, 2, ..., M), where M is the total number of partitions. The result of computation of for all (i, j=1, 2, ..., M) is a square matrix $\pi(M) = [\pi_{ij}(M)]_{M \times M}$ that represents the dynamics of the given sequence of intensities of pixels.

Figure 5:
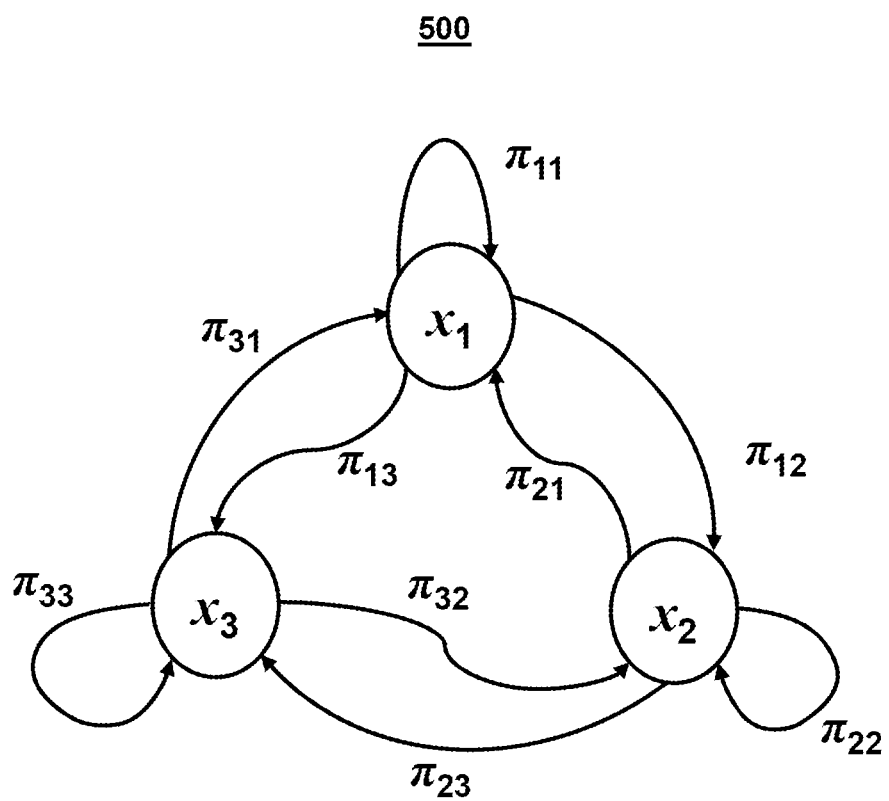
FIG. 5 depicts an illustrative diagram of a probability of transition from a state to another state, in accordance with an embodiment.

In some embodiments, the dynamics of the sequence may be visually described by a probabilistic finite state automaton ("PFSA"), where the probability of the next state, given the current state, can be estimated based on the estimated probabilities of $\pi(M)$. FIG. 5 shows, diagram 500, which is the PFSA of the example shown in FIG. 4 for the case of three partitions. For example, FIG. 5 depicts an illustrative diagram of a probability of transition from a state to another state, in accordance with an embodiment.

The selection of the number of partitions significantly influences the process of dynamics extraction, and tangibly leverages the performance of the given signature verification. For example, if there are too many partitions, the system will have high amounts of noise and too much complexity. The optimal partition reduces the noise, and provides an acceptable amount of complexity. To select the optimal number of partitions, the system uses an entropy maximization-based technique, where the entropy H(M)-of the sequence of partitions is computed using:

$$H(M) = -\Sigma_{m=1}^{M} P(x_m) \log(P(x_m)) \quad (3)$$

where $P(x_m)$ is the probability of occurrence of partition $x_m$, m=1, ..., M. The system may determine an optimal number of partitions M* such that the computed entropy is maximized, which may be realized by:

$$M^* = \arg \max_{M} H(M) \quad (4)$$

It should be noted that the entropy maximization-based estimation of the optimal number of partitions allows for efficient employment to the case of detection of forgery of signatures, where, in practice, the system has only genuine signature and forged signature results in a tangible impact on the dynamic behavior of the corresponding sequence of intensities of the signature image. To realize the optimization objective of (4), one can use the notion of difference to find a local optimal solution.

For example, as an illustrative algorithm, an input may be an image of an original signature, G. The system may then initialize itself by using step size, h, and clusters lower bound M̲ and tolerance, ε. The system may convert G into sequence S. The system may then perform a k-means to extract states $X=[x_m]$ of S. The system may then compute the entropy using objective (3). A stopping condition for the algorithm may be $|H(M)-H(M-h)|<\varepsilon$, which represents the estimation of local maximum value for the entropy H(M) by using the difference equation. While the difference equation assists in optimizing the given objective function, it may be susceptible to early fall into local optima that degrades the performance of the process of selecting an optimized number of partitions. To mitigate this potential issue of being trapped early into local optima, the system may take one or more measures, such as tuning the value of the step size increment of M, say h, such that early trapping into local optima is reduced. Additionally or alternatively, the system may use the difference equation of $|H(M)-H(M-h)|<\varepsilon$, along with $|\Delta H(M)-\Delta H(M-h)|<\varepsilon$, as stopping conditions for updating the value of M, where $\Delta H(M)=|H(M)-H(M-h)|$. Indeed, $|H(M)-H(M-h)|$ and $|\Delta H(M)-\Delta H(M-h)|$ represent first order and second order difference equations of H(M), respectively. By using both first order and second order difference equations of H(M), the system provides a robust optimization process with reduced potential for early trapping into local optima.

Figure 6:
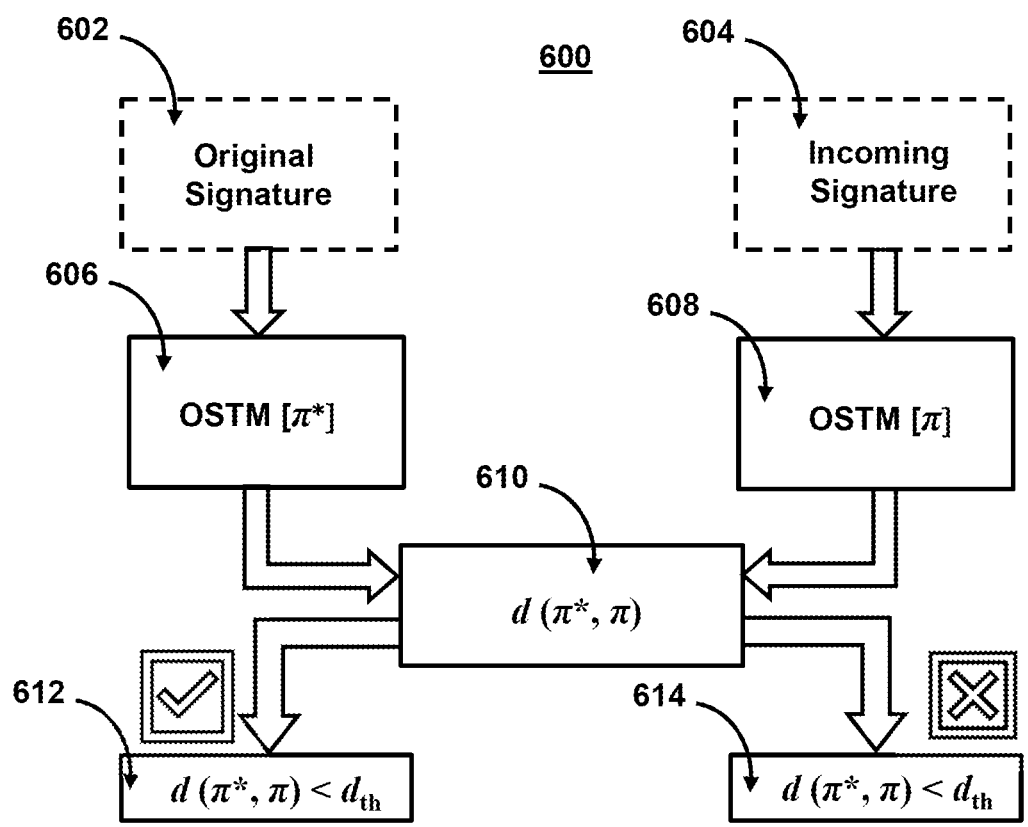
FIG. 6 depicts an illustrative diagram of a decision making process for real-time electronic verification in data-sparse computer environment, in accordance with an embodiment.

FIG. 6 depicts an illustrative diagram of a decision making process for real-time electronic verification in a data-sparse computer environment, in accordance with an embodiment. For example, process 600 may indicate a decision making process for real-time electronic verification. For example, process 600 may describe the use of OSTM by the system to develop a decision about a given signature. A genuine signature (e.g., a single signature and/or example of forgeries) may be used to develop a decision-making strategy, and the objective of the system may be to detect any potential forgery—or tangible variation—in an incoming signature.

As step 602, process 600 may receive original and/or authenticated content (e.g., an original signature). Similarly, at step 604, process 600 may receive new content that is awaiting verification and/or classification. At step 606, process 600 may determine an OSTM of the authenticated content. Similarly, at step 608, a process may determine an OSTM of the new content.

For example, an unsupervised decision-making process is utilized to realize potential forgery detection in signatures, where in the learning process the OSTM, the π* of the authenticated content is computed. The entropy-based partitioning described in objective (4), may be used to obtain an optimal number of partitions for the authenticated content. Once new content is required to be verified/classified, then the system (e.g., in real-time) determines a corresponding OSTM n.

At step 610, process 600 determines a difference between OSTM π* and OSTM π. With respect to signatures, any forging process is reflected on the dynamics of the sequence of the given signature, causing a tangible deviation in the OSTM. The system may capture the discrepancy, or distance, between the OSTM of the authenticated content π* and that of the new content π, which is used as a measure to decide how to verify/classify the new content (e.g., determine if a signature is forged or not).

As shown in process 600 at step 612, distances below a threshold may be verified, and as shown in step 614, distances above a threshold may not be verified. For example, if the distance between π* and π is greater than or equals to a pre-defined threshold, then an indication of a potential forgery is raised. Otherwise, an indication that the incoming signature belongs to the authorized signee is validated. The system may determine the threshold based on the type of content and/or other characteristics related to the content. In some embodiments, the system may also use additional factors and/or contextual knowledge to define a threshold. For example, the system may have an additional model that determines a threshold based on one or more criteria.

Multiple distance measures were shown to have good discrimination ability, like Euclidean distance. Indeed Euclidean distance can be estimated using:

$$d(\pi^*,\pi) = \Sigma_{i=1}^{M} \Sigma_{j=1}^{M} (\pi^*_{ij} - \pi_{ij}) \quad (7)$$

which gives a good discrepancy measure between π* and π.

It should be noted that the decision-making stage may take other forms, based on the application in hand. For instance, if the system is required to perform the classification process of given images belonging to multiple categories, then the decision-making process may be a classifier that is trained by using an OSTM that is extracted for each given training image as an input and its corresponding label as output.

FIG. 7 depicts an illustrative diagram of error rates for a plurality of verification techniques, in accordance with an embodiment. FIG. 7 includes table 700. For example, to evaluate the performance of the system, a CEDAR dataset is used, which contains signatures of 55 subjects. Each subject has 24 genuine signatures originated from the corresponding subject himself and 24 forged signatures generated by skilled people other than the corresponding subject. The system thus had 2640 signatures in total and the objective was to distinguish genuine and forged signatures using given scanned images of signatures. To identify optimal number of partitions, the value of h was chosen empirically to be 3 and ε was taken to be 0.04. Using an algorithm with multiple stopping conditions (as described above) yielded efficient estimation of the number of partitions and OSTM for each signee. Out of 2640 samples, 76 samples were mis-classified, and the rest were correctly classified, resulting in error rate of 2.87%.

Accordingly, the system outperforms available techniques in verifying given signatures. Such enhancement in performance stems from the ability of the system to detect tangible variations, caused by forging, reflected on the dynamics of the sequence of pixels. The system provides simultaneous filtering and detection, rendering the technique robust—to a certain extent—against noise in scanned images. Furthermore, optimizing the number of partitions for each signee gives the system the ability to map the best possible dynamics representation of the sequence of pixels of a scanned image of a given signature, which enhances the performance of the detection process.

Figure 8:
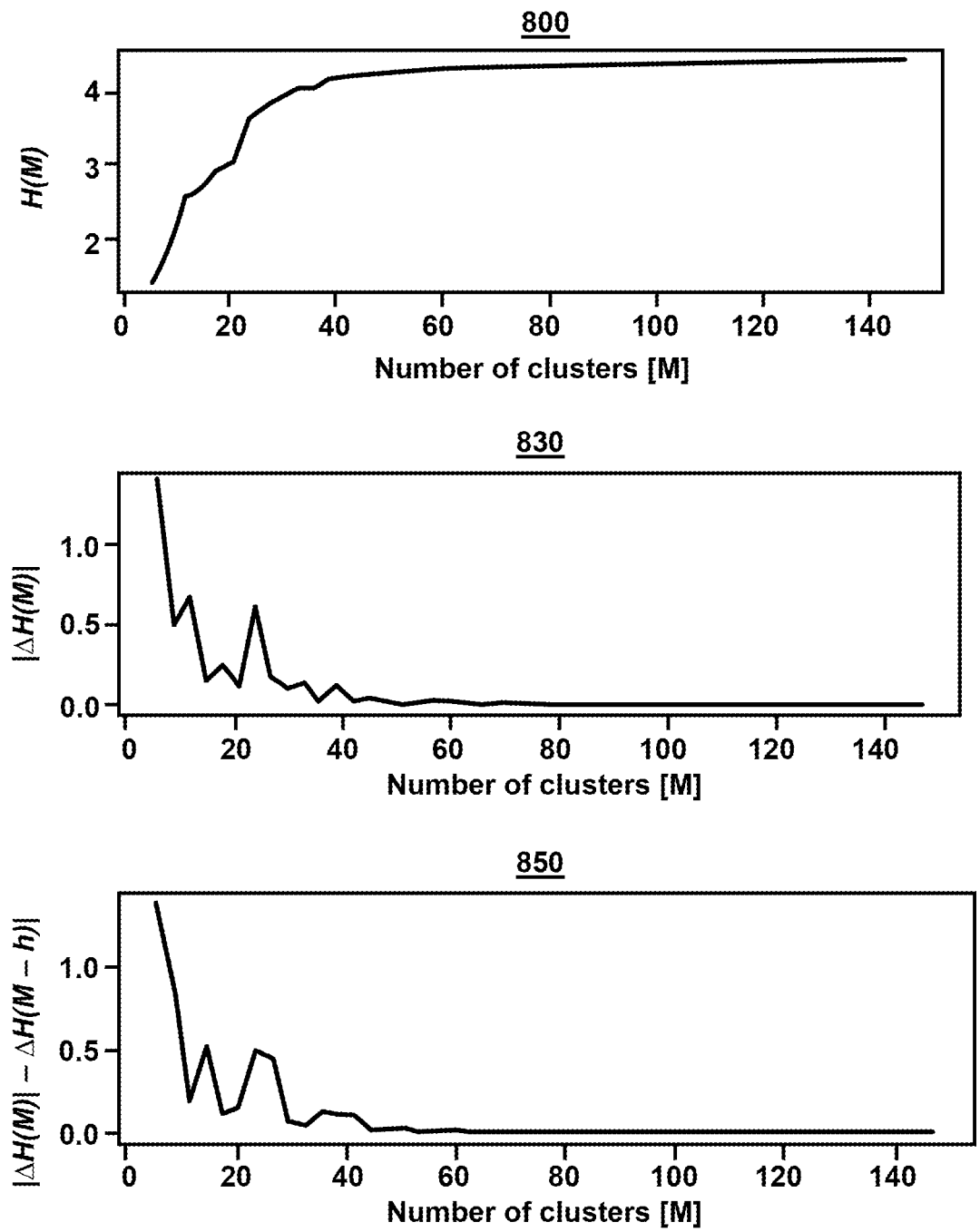
FIG. 8 depicts an illustrative diagram of entropy in relation to partitions, in accordance with an embodiment.

FIG. 8 depicts an illustrative diagram of entropy in relation to partitions, in accordance with an embodiment. For example, FIG. 8 shows the computed entropy, along with its absolute values of the first and second differences, as considerations. Chart 800 shows the variation of the entropy H(M) with respect to number of partitions M for a genuine signature of one of the signees in CEDAR dataset. The corresponding absolute values of first and second difference equations are given in chart 830 and chart 850, respectively. As shown in chart 800, the entropy increases with increase in number of partitions, which means information exchange between distinct partitions is dwindled as we increase number of partitions. Nevertheless, a large number of partitions results in potential susceptibility to noise, rendering obtaining optimal number of partitions to be a challenging task. However, employment of an algorithm with multiple stopping conditions (as described above) assures estimation of optimal number of partitions that maximizes the entropy without the need to use a large number of partitions. For example, chart 830 and chart 850 show that at M=45, both stopping conditions of the absolute values of both first and second difference equations need to be satisfied, leading to obtaining a reasonable local optimal solution for the considered signee. As shown, only one genuine signature is required to develop considered models of signatures, relaxing a tangible amount of computational resources.

Figure 9:
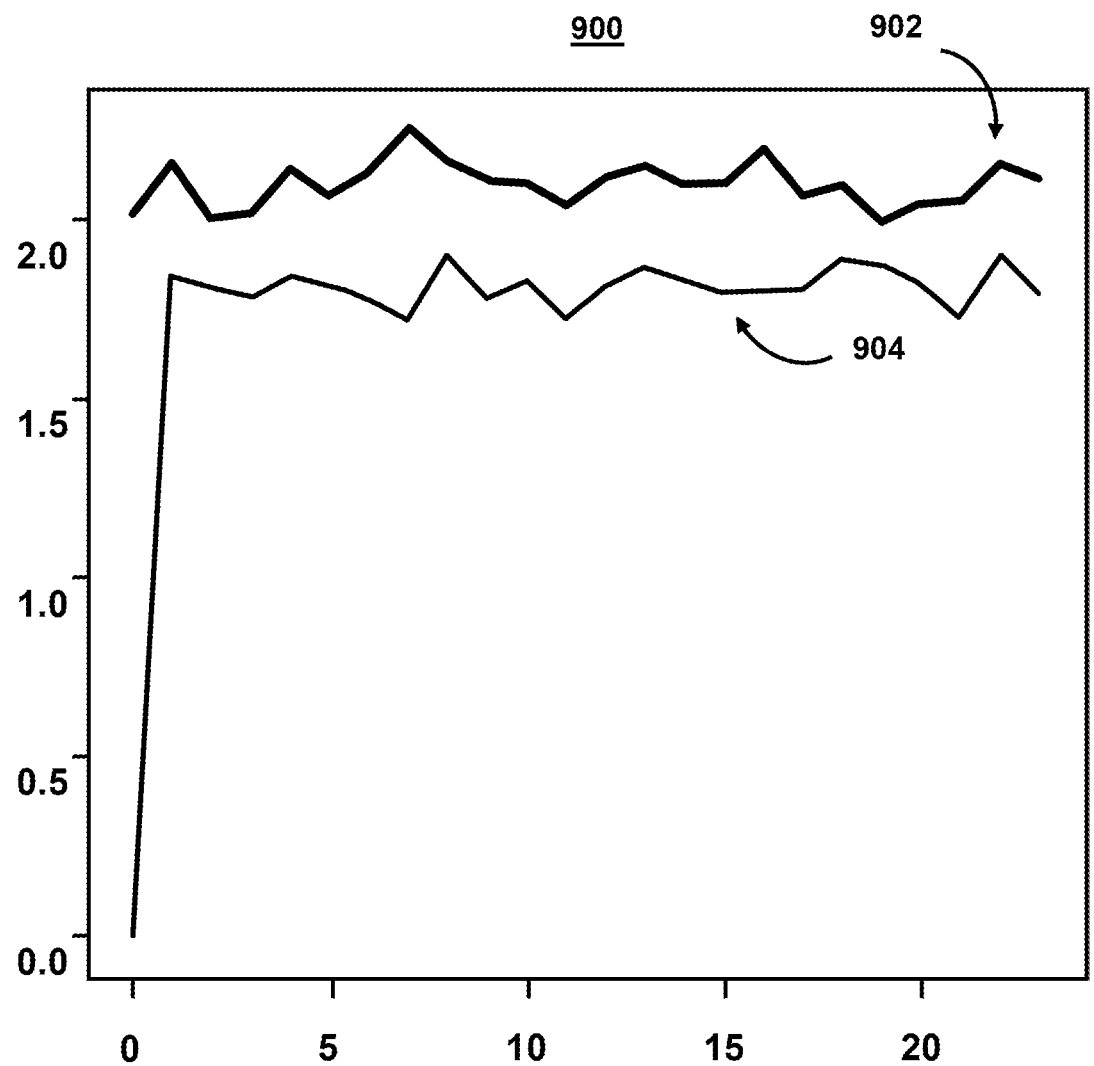
FIG. 9 depicts an illustrative diagram of deviations between two signatures, in accordance with an embodiment.

FIG. 9 depicts an illustrative diagram of deviations between two signatures, in accordance with an embodiment. For example, while one signature is sufficient for the system, additional authenticated signatures may provide even better performance (e.g., more authenticated signatures may help in the estimation of optimal distance threshold required to make a decision as to whether a given signature is genuine or originated by a skilled forgery process).

For example, chart 900 further elaborates on the distance selection (e.g., the Y axis) as additional authenticated signatures (X axis) are obtained. In chart 900, a distance metric between the OSTM model of the system of one of the genuine signatures and a corresponding OSTM models of other genuine (line 904) and forged (line 902) signatures. As shown, another genuine signature might be enough to have an indication that a threshold of 1.8 is a good distance metric to decide if an incoming future signature is genuine or forged. Of course, more genuine signatures can give more accurate indications on the value of the decision threshold. The given experiment on the CEDAR dataset shows an explicit enhancement in distinguishing genuine and forged signatures.

Figure 10:
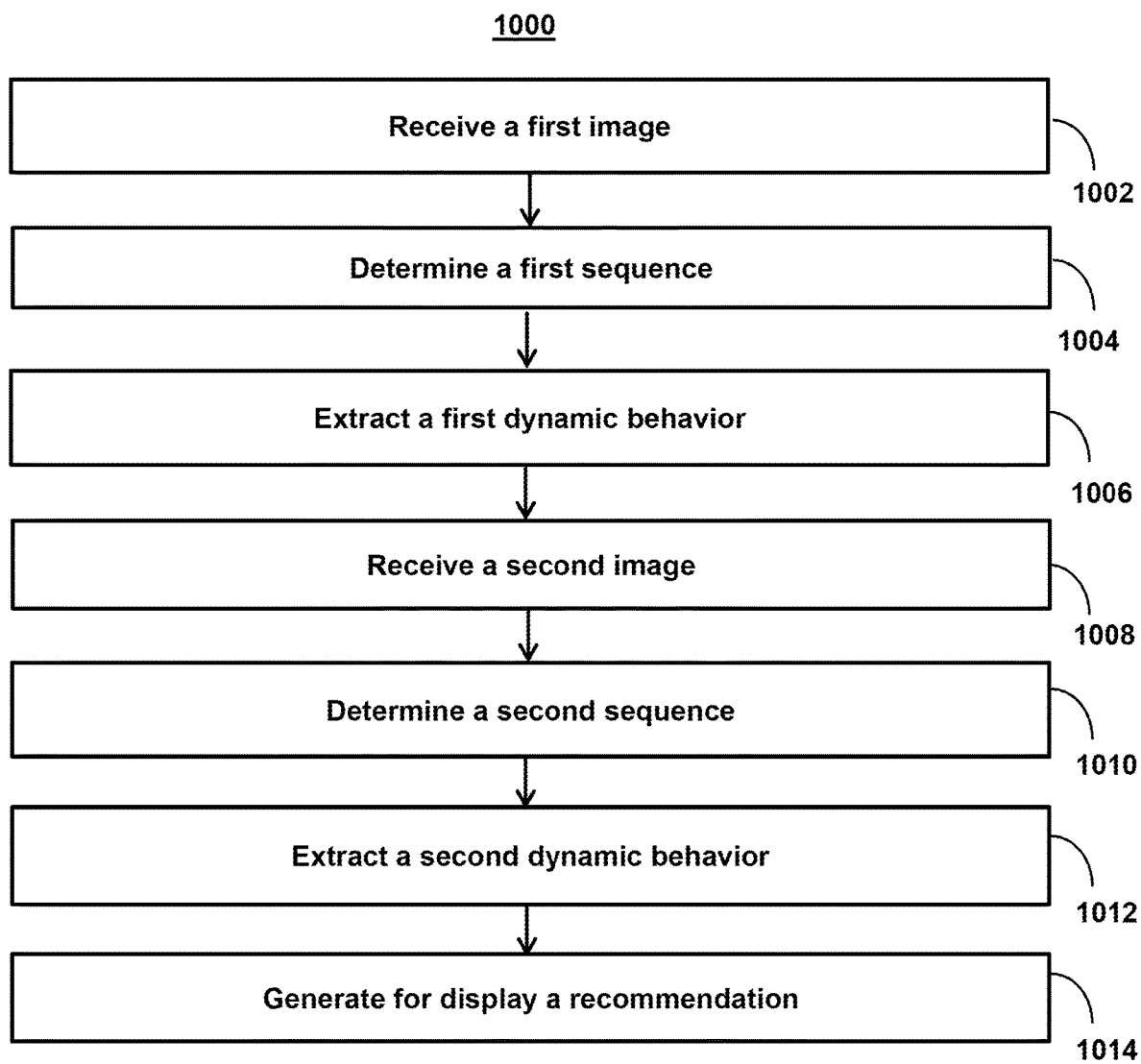
FIG. 10 depicts a flow chart for steps for real-time electronic signature verification in a data-sparse computer environment, in accordance with an embodiment.

FIG. 10 depicts a flow chart for steps for real-time electronic signature verification in data-sparse computer environment, in accordance with an embodiment. For example, FIG. 10 shows process 1000, which may be implemented by one or more devices. The system may implement process 1000 in order to generate one or more recommendations. For example, the recommendation may indicate that content in an image may corresponds to content associated with a given user (e.g., a signature) and thus identify that the content relates to that user and/or verify that the content (e.g., a received signature) is authentic content (e.g., an authentication signature). Process 1000 may perform two main stages: feature extraction and decision-making based on extracted features. In the feature extraction stage (e.g., occurring at component 104 (FIG. 1)), pixels of an image of a signature are converted into a set of numeric values called features of the given image. Features of a given image of a signature are used as inputs to the second stage (e.g., occurring at component 106 (FIG. 1)), the decision-making process, which generates a decision and gives the signee who has most likely signed the given signature.

At step 1002, process 1000 (e.g., using control circuitry and/or one or more components described in FIG. 2) receives a first image. For example, the system may receive a first image, wherein the first image comprises a first signature. The first signature may be an authenticated signature of a known user.

At step 1004, process 1000 (e.g., using control circuitry and/or one or more components described in FIG. 2) determines a first sequence. For example, the system may determine a first sequence, wherein the first sequence comprises a sequence of intensity of pixels composing the first image. In some embodiments, the first sequence may comprise both vertical and horizontal concatenations of pixels composing the first image.

For example, a signature image may be converted into a sequence of values of intensities of pixels of a given image. Such image to sequence conversion may be performed by concatenating values of intensities of pixels, resulting in a sequence of values reflecting pixels intensities of the image. Each pixel may have one or more intensity values (e.g., three intensity values corresponding to red, green, and blue (e.g., RGB)). Therefore, the system may extract one or more (e.g., three sequences) for each signature image, one for each pixel intensity component. To keep computational cost reasonably low, the system may use grayscale intensity values instead of RGB by transforming a given signature into its grayscale equivalence, where each pixel is represented by a single intensity value.

In some embodiments, the system may horizontally concatenate pixels, row by row, to obtain a sequence of intensities of pixels (e.g., sequence 304 (FIG. 3)). The system may additionally or alternatively vertically concatenate pixels, column by column, to obtain a sequence of intensities of pixels (e.g., sequence 306 (FIG. 3)). The system may then combine the intensities into a combined intensity of pixels. In some embodiments, the system may also calculate an intensity of pixels based on a width of pixels (e.g., using the embodiment of FIG. 3).

At step 1006, process 1000 (e.g., using control circuitry and/or one or more components described in FIG. 2) extracts a first dynamic behavior. For example, the system may extract a first dynamic behavior of the first sequence. In some embodiments, extracting the first dynamic behavior of the first sequence may comprise determining a first OSTM that represents the first dynamic behavior. For example, the system may extract a dynamical behavior of the sequence of intensities of pixels (e.g., of a signature image), by computing the OSTM. The system may compute the OSTM by dividing values of the obtained sequence (e.g., of a signature image). The dynamic sequence may comprise a series of partitions, in which each partition represents a symbol or a state of the given sequence.

At step 1008, process 1000 (e.g., using control circuitry and/or one or more components described in FIG. 2) receives a second image. For example, the system may receive a second image, wherein the second image comprises a second signature.

At step 1010, process 1000 (e.g., using control circuitry and/or one or more components described in FIG. 2) determines a second sequence. For example, the system may determine a second sequence, wherein the second sequence comprises a sequence of intensity of pixels composing the second image. In some embodiments, the second sequence may comprise both vertical and horizontal concatenations of pixels composing the second image.

At step 1012, process 1000 (e.g., using control circuitry and/or one or more components described in FIG. 2) extract a second dynamic behavior. For example, the system may extract a second dynamic behavior of the second sequence. In some embodiments, extracting the second dynamic behavior of the second sequence may comprise determining a second OSTM that represents the second dynamic behavior.

In some embodiments, determining an OSTM may comprises several steps. For example, the system may partition the first sequence based on equidistance division on values in the first sequence. The system may determine a third sequence by mapping each sample of the first sequence into its corresponding partition, wherein the third sequence represents a sequence of states. The system may determine a stochastic transition matrix by estimating a probability of transition between the states. The system may determine a number of partitions for determining the OSTM by determining a maximum entropy. In some embodiments, the number of partitions is further based on a stopping condition for updating the number of partitions.

Additionally or alternatively, in some embodiments, determining an OSTM may comprises several different steps. For example, the system may partition the first sequence based on k-means clustering on values in the first sequence. The system may determine a third sequence by mapping each sample of the first sequence into its corresponding partition, wherein the third sequence represents a sequence of states. The system may determine a stochastic transition matrix by estimating a probability of transition between states of the sequence of states. The system may determine a number of partitions for determining the OSTM by determining a maximum entropy. In some embodiments, the number of partitions is further based on a stopping condition for updating the number of partitions.

At step 1014, process 1000 (e.g., using control circuitry and/or one or more components described in FIG. 2) generates for display a recommendation. For example, the system may generate for display, on a user interface, a recommendation based on comparing the first dynamic behavior to the second dynamic behavior. In some embodiments, generating for display the recommendation based on comparing the first dynamic behavior to the second dynamic behavior may comprise several steps. For example, the system may generate a feature input based on the second dynamic behavior. The system may input the feature input into a machine learning model to determine a classification of the second dynamic behavior, wherein the machine learning model is trained based on the first dynamic behavior. The system may receive an output from the machine learning model indicating the classification of the second dynamic behavior. The system may select the recommendation from a plurality of recommendations based on the output.

In some embodiments, generating for display the recommendation based on comparing the first dynamic behavior to the second dynamic behavior may be comprised of different steps. For example, the system may determine an authenticity of the second signature based on comparing the first dynamic behavior to the second dynamic behavior, wherein the first signature is an authenticated signature, and wherein the second signature requires electronic verification. The system may then select the recommendation from a plurality of recommendations based on the authenticity. In some embodiments, determining the authenticity of the second signature based on comparing the first dynamic behavior to the second dynamic behavior may further comprise of several steps. For example, the system may determine a deviation (e.g., based on a Euclidean distance) between the first dynamic behavior to the second dynamic behavior. The system may then compare the deviation to a threshold deviation.

It is contemplated that the steps or descriptions of FIG. 10 may be used with any other embodiment of this disclosure. In addition, the steps and descriptions described in relation to FIG. 10 may be done in alternative orders, or in parallel to further the purposes of this disclosure. For example, each of these steps may be performed in any order, in parallel, or simultaneously to reduce lag, or increase the speed of the system or method. Furthermore, it should be noted that any of the devices or equipment discussed in relation to FIGS. 1-9 could be used to perform one or more of the steps in FIG. 10.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:
1. A method for real-time electronic signature verification in data-sparse computer environment, the method comprising: determining an OSTM for an image; and generating a recommendation based on the OSTM.
2. A method for real-time electronic signature verification in data-sparse computer environment, the method comprising: receiving a first image, wherein the first image comprises a first signature; determining a first sequence, wherein the first sequence comprises a sequence of intensity of pixels composing the first image; extracting a first dynamic behavior of the first sequence; receiving a second image, wherein the second image comprises a second signature; determining a second sequence, wherein the second sequence comprises a sequence of intensity of pixels composing the second image; extracting a second dynamic behavior of the second sequence; and generating for display, on a user interface, a recommendation based on comparing the first dynamic behavior to the second dynamic behavior.
3. The method of any of the preceding claims, wherein generating for display the recommendation based on comparing the first dynamic behavior to the second dynamic behavior, further comprises: determining an authenticity of the second signature based on comparing the first dynamic behavior to the second dynamic behavior, wherein the first signature is an authenticated signature, and wherein the second signature requires electronic verification; and selecting the recommendation from a plurality of recommendations based on the authenticity.
4. The method of any of the preceding claims, wherein determining the authenticity of the second signature based on comparing the first dynamic behavior to the second dynamic behavior comprises: determining a deviation between the first dynamic behavior to the second dynamic behavior; and comparing the deviation to a threshold deviation.
5. The method of any of the preceding claims, wherein the deviation is based on a Euclidean distance.
6. The method of any of the preceding claims, wherein generating for display the recommendation based on comparing the first dynamic behavior to the second dynamic behavior, further comprises: generating a feature input based on the second dynamic behavior; inputting the feature input into a machine learning model to determine a classification of the second dynamic behavior, wherein the machine learning model is trained based on the first dynamic behavior; receiving an output from the machine learning model indicating the classification of the second dynamic behavior; and selecting the recommendation from a plurality of recommendations based on the output.
7. The method of any of the preceding claims, wherein the first sequence comprises both vertical and horizontal concatenations of pixels composing the first image.
8. The method of any of the preceding claims, wherein extracting the first dynamic behavior of the first sequence comprises determining a first optimal stochastic transition matrix (OSTM) that represents the first dynamic behavior.
9. The method of any of the preceding claims, wherein determining the OSTM comprises: partitioning the first sequence based on equidistance division on values in the first sequence; determining a third sequence by mapping each sample of the first sequence into its corresponding partition, wherein the third sequence represents a sequence of states; determining a stochastic transition matrix by estimating a probability of transition between the states; and selecting a number of partitions for determining the OSTM by determining a maximum entropy.
10. The method of any of the preceding claims, wherein determining the OSTM comprises: partitioning the first sequence based on k-means clustering on values in the first sequence; determining a third sequence by mapping each sample of the first sequence into its corresponding partition, wherein the third sequence represents a sequence of states; determining a stochastic transition matrix by estimating a probability of transition between states of the sequence of states; and determining a number of partitions for determining the OSTM by determining a maximum entropy.
11. The method of any of the preceding claims, wherein the number of partitions is further based on a stopping condition for updating the number of partitions.
12. A tangible, non-transitory, machine-readable medium storing instructions that, when executed by a data processing apparatus, cause the data processing apparatus to perform operations comprising those of any of embodiments 1-11.
13. A system comprising: one or more processors and memory storing instructions that, when executed by the processors, cause the processors to effectuate operations comprising those of any of embodiments 1-11.
14. A system comprising means for performing any of embodiments 1-11.

What is claimed is:
1. A system for real-time electronic signature verification in a data-sparse computer environment, the system comprising:
   cloud-based storage circuitry configured to store a first image, wherein the first image comprises a first signature, wherein the first signature is an authenticated signature;
   control circuitry configured to:
      determine a first sequence, wherein the first sequence comprises a sequence of intensity for both vertical and horizontal concatenations of pixels composing the first image;
      extract a first dynamic behavior of the first sequence, wherein extracting the first dynamic behavior of the first sequence comprises determining a first optimal stochastic transition matrix (OSTM) that represents the first dynamic behavior;

receive a second image, wherein the second image comprises a second signature, wherein the second signature requires electronic verification;

determine a second sequence, wherein the second sequence comprises a sequence of intensity for both vertical and horizontal concatenations of pixels composing the second image;

extract a second dynamic behavior of the second sequence, wherein extracting the second dynamic behavior of the second sequence comprises determining a second optimal stochastic transition matrix (OSTM) that represents the second dynamic behavior;

determine an authenticity of the second signature based on comparing the first dynamic behavior to the second dynamic behavior;

select a recommendation from a plurality of recommendations based on the authenticity; and input/output circuitry configured to generate for display, on a user interface, the recommendation.

2. A method for real-time electronic signature verification in data-sparse computer environment, the method comprising:

receiving a first image, wherein the first image comprises a first signature;

determining a first sequence, wherein the first sequence comprises a sequence of intensity of pixels composing the first image;

extracting a first dynamic behavior of the first sequence, wherein extracting the first dynamic behavior of the first sequence comprises determining a first optimal stochastic transition matrix (OSTM) that represents the first dynamic behavior;

receiving a second image, wherein the second image comprises a second signature;

determining a second sequence, wherein the second sequence comprises a sequence of intensity of pixels composing the second image;

extracting a second dynamic behavior of the second sequence; and generating for display, on a user interface, a recommendation based on comparing the first dynamic behavior to the second dynamic behavior.

3. The method of claim 2, wherein generating for display the recommendation based on comparing the first dynamic behavior to the second dynamic behavior, further comprises:

determining an authenticity of the second signature based on comparing the first dynamic behavior to the second dynamic behavior, wherein the first signature is an authenticated signature, and wherein the second signature requires electronic verification; and selecting the recommendation from a plurality of recommendations based on the authenticity.

4. The method of claim 3, wherein determining the authenticity of the second signature based on comparing the first dynamic behavior to the second dynamic behavior comprises:

determining a deviation between the first dynamic behavior to the second dynamic behavior; and comparing the deviation to a threshold deviation.

5. The method of claim 4, wherein the deviation is based on a Euclidean distance.

6. The method of claim 2, wherein generating for display the recommendation based on comparing the first dynamic behavior to the second dynamic behavior, further comprises:

generating a feature input based on the second dynamic behavior;

inputting the feature input into a machine learning model to determine a classification of the second dynamic behavior, wherein the machine learning model is trained based on the first dynamic behavior;

receiving an output from the machine learning model indicating the classification of the second dynamic behavior; and selecting the recommendation from a plurality of recommendations based on the output.

7. The method of claim 2, wherein the first sequence comprises both vertical and horizontal concatenations of pixels composing the first image.

8. The method of claim 2, wherein determining the OSTM comprises:

partitioning the first sequence based on equidistance division on values in the first sequence;

determining a third sequence by mapping each sample of the first sequence into its corresponding partition, wherein the third sequence represents a sequence of states;

determining a stochastic transition matrix by estimating a probability of transition between the states; and determining a number of partitions for determining the OSTM by determining a maximum entropy.

9. The method of claim 2, wherein determining the OSTM comprises:

partitioning the first sequence based on k-means clustering on values in the first sequence;

determining a third sequence by mapping each sample of the first sequence into its corresponding partition, wherein the third sequence represents a sequence of states;

determining a stochastic transition matrix by estimating a probability of transition between states of the sequence of states; and determining a number of partitions for determining the OSTM by determining a maximum entropy.

10. The method of claim 9, wherein the number of partitions is further based on a stopping condition for updating the number of partitions.

11. A non-transitory, computer-readable medium for real-time electronic signature verification in a data-sparse computer environment, comprising instructions that, when executed by one or more processors, cause operations comprising:

receiving a first image, wherein the first image comprises a first signature;

determining a first sequence, wherein the first sequence comprises a sequence of intensity of pixels composing the first image;

extracting a first dynamic behavior of the first sequence, wherein extracting the first dynamic behavior of the first sequence comprises determining a first optimal stochastic transition matrix (OSTM) that represents the first dynamic behavior;

receiving a second image, wherein the second image comprises a second signature;

determining a second sequence, wherein the second sequence comprises a sequence of intensity of pixels composing the second image;

extracting a second dynamic behavior of the second sequence; and generating for display, on a user interface, a recommendation based on comparing the first dynamic behavior to the second dynamic behavior.

12. The non-transitory, computer-readable medium of claim 11, wherein generating for display the recommendation based on comparing the first dynamic behavior to the second dynamic behavior, further comprises:

determining an authenticity of the second signature based on comparing the first dynamic behavior to the second dynamic behavior, wherein the first signature is an authenticated signature, and wherein the second signature requires electronic verification; and selecting the recommendation from a plurality of recommendations based on the authenticity.

13. The non-transitory, computer-readable medium of claim 12, wherein determining the authenticity of the second signature based on comparing the first dynamic behavior to the second dynamic behavior comprises:

determining a deviation between the first dynamic behavior to the second dynamic behavior; and comparing the deviation to a threshold deviation.

14. The non-transitory, computer-readable medium of claim 11, wherein generating for display the recommendation based on comparing the first dynamic behavior to the second dynamic behavior, further comprises:

generating a feature input based on the second dynamic behavior;

inputting the feature input into a machine learning model to determine a classification of the second dynamic behavior, wherein the machine learning model is trained based on the first dynamic behavior;

receiving an output from the machine learning model indicating the classification of the second dynamic behavior; and selecting the recommendation from a plurality of recommendations based on the output.

15. The non-transitory, computer-readable medium of claim 11, wherein the first sequence comprises both vertical and horizontal concatenations of pixels composing the first image.

16. The non-transitory, computer-readable medium of claim 11, wherein determining the OSTM comprises:

partitioning the first sequence based on equidistance division on values in the first sequence;

determining a third sequence by mapping each sample of the first sequence into its corresponding partition, wherein the third sequence represents a sequence of states;

determining a stochastic transition matrix by estimating a probability of transition between the states; and determining a number of partitions for determining the OSTM by determining a maximum entropy.

17. The non-transitory, computer-readable medium of claim 11, wherein the determining the OSTM comprises:

partitioning the first sequence based on k-means clustering on values in the first sequence;

determining a third sequence by mapping each sample of the first sequence into its corresponding partition, wherein the third sequence represents a sequence of states;

determining a stochastic transition matrix by estimating a probability of transition between states of the sequence of states; and determining a number of partitions for determining the OSTM by determining a maximum entropy.

18. The non-transitory, computer-readable medium of claim 17, wherein the number of partitions is further based on a stopping condition for updating the number of partitions.

\* \* \* \* \*